United States Patent [19]
Yoshida et al.

[11] Patent Number: 6,075,620
[45] Date of Patent: Jun. 13, 2000

[54] COMMUNICATION APPARATUS HAVING COMMUNICATION FUNCTION COMPLYING WITH ITU-T V. 8 AND V. 34 RECOMMENDATIONS

[75] Inventors: Takehiro Yoshida, Tokyo; Fumiyuki Takiguchi, Yokohama, both of Japan

[73] Assignee: Canon Kabushiki Kaisha, Tokyo, Japan

[21] Appl. No.: 09/084,366

[22] Filed: May 27, 1998

[30] Foreign Application Priority Data

May 30, 1997 [JP] Japan .................................. 9-158146

[51] Int. Cl.$^7$ ............................ H04N 1/00; H04M 11/00
[52] U.S. Cl. ........................................ 358/434; 379/93.31
[58] Field of Search ..................... 358/434, 435; 379/93.09, 93.31

[56] References Cited

U.S. PATENT DOCUMENTS

| | | | |
|---|---|---|---|
| 5,721,731 | 2/1998 | Yoshida | 370/296 |
| 5,751,441 | 5/1998 | Morimoto | 358/435 |
| 5,787,116 | 7/1998 | Lam et al. | 379/90.01 |

FOREIGN PATENT DOCUMENTS

| | | | |
|---|---|---|---|
| 8-204684 | 8/1996 | Japan | H04L 5/16 |
| 8-242221 | 9/1996 | Japan | H04L 5/14 |
| 9-186838 | 7/1997 | Japan | H04N 1/32 |
| 10-285375 | 10/1998 | Japan | H04N 1/32 |
| 10-290342 | 10/1998 | Japan | H04N 1/32 |
| 11-112759 | 4/1999 | Japan | H04M 11/00 |

*Primary Examiner*—Kimberly A. Williams
*Attorney, Agent, or Firm*—Fitzpatrick, Cella, Harper & Scinto

[57] ABSTRACT

In a communication apparatus (e.g., a facsimile apparatus) having ITU-T V. 8 and V. 34 recommendations, when it is determined that a partner has the V. 8 and V. 34 functions, the apparatus omits detailed determination processing of reception of an ANSam signal in V. 8 communication, and shifts control to transmission of a CM signal in the V. 8 communication, thereby shortening the time required for the V. 8 communication.

10 Claims, 5 Drawing Sheets

COMMUNICATION APPARATUS HAVING COMMUNICATION FUNCTION COMPLYING WITH ITU-T V. 8 AND V. 34 RECOMMENDATIONS

BACKGROUND OF THE INVENTION

1. Field of the Invention

The present invention relates to a communication apparatus having a communication function complying with the ITU-T V. 8 and V. 34 recommendations.

2. Related Background Art

A facsimile apparatus having a facsimile communication function complying with the ITU-T V. 8 and V. 34 recommendations is known as a conventional apparatus of this type.

V. 34 communication allows image data communication at a high transmission rate of 33.6 kbps or 28.8 kbps. The image data of an A4 size standard original page can be transmitted within about 3 sec.

To perform V. 34 communication, the V. 34 communication mode must be set in V. 8 communication. In the V. 8 communication, an ANSam signal (2,100-Hz modified response tone signal) must be communicated for 3 to 5 sec, and then a CM signal (call menu signal) and a JM signal (common menu signal) must be communicated, thereby setting the V. 34 communication (confirmation of the V. 34 communication). In the V. 8 communication, the ANSam signal is communicated for 3 to 5 sec. If a calling party is a person, however, the calling party can sufficiently recognize that the called party is a non-speech terminal by hearing the tone signal of about 3 sec. If the calling party is a facsimile apparatus complying with only the general ITU-T T. 30 recommendations, a signal must be received for 3 to 5 sec to distinguish the ANSam signal from a CED signal (2,100-Hz tone signal) used in the T. 30 recommendations.

In the V. 8 communication, when the communication of the ANSam signal always requires 3 to 5 sec, a time required for the preprocedure becomes long although one-page communication in the V. 34 mode can complete in about 3 sec.

SUMMARY OF THE INVENTION

It is an object of the present invention to shorten a time required in V. 8 communication and a time required for the preprocedure in consideration of the conventional problem described above.

It is another object of the present invention to provide a communication apparatus capable of omitting the detailed reception determination process of an ANSam signal and shifting the process to transmission of a CM signal within a short period of time because the ANSam signal is necessarily transmitted when the partner (called party) has the V. 8 and V. 34 functions and it is already determined that the called party has these functions.

It is still another object of the present invention to provide a communication apparatus in which the presence/absence of the V. 8 and V. 34 functions is registered for each destination to change the control in accordance with the communication function of the partner, wherein the communication time can be shortened when the partner has the V. 34 communication function.

The above and other objects, features, and advantages of the present invention will be apparent from the following detailed description of the preferred embodiments in conjunction with the accompanying drawings.

DETAILED DESCRIPTION OF THE PREFERRED EMBODIMENTS

The preferred embodiments of the present invention will be described with reference to the accompanying drawings.

Figure 1:
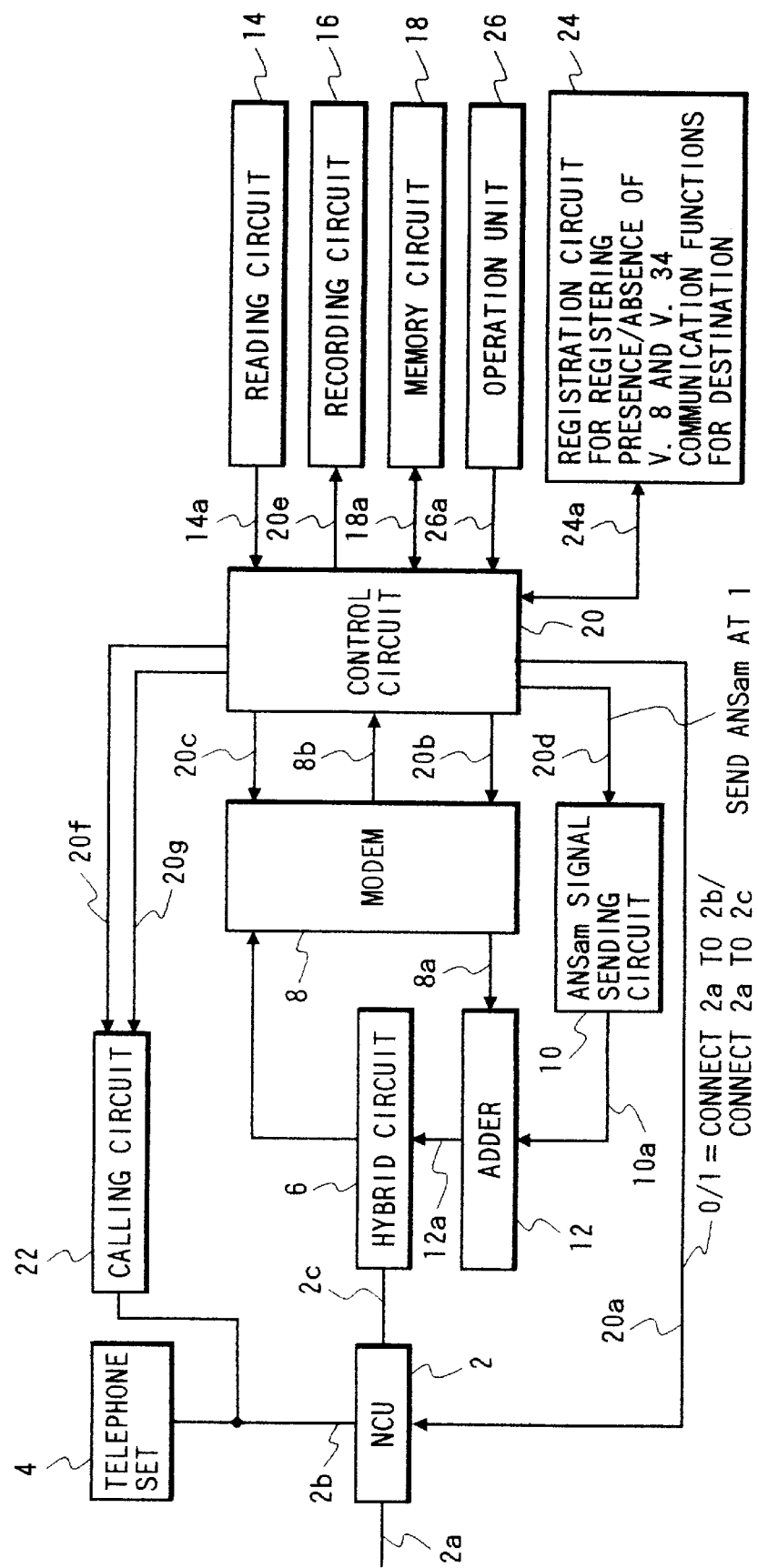
FIG. 1 is a block diagram showing the arrangement of a facsimile apparatus of the present invention.

FIG. 1 is a block diagram showing the arrangement of a facsimile apparatus of the present invention.

An NCU (Network Control Unit) 2 is connected to a line terminal, performs connection control of a telephone network, switches the line to the data communication line, and holds the loop in order to use the telephone network for data communications. When a signal level (signal line 20a) from a control circuit is set at "0", the NCU 2 connects a telephone line 2a to a telephone set 4. When the signal level is set at "1", the NCU 2 connects the telephone line 2a to the facsimile apparatus. In the normal state, the telephone line 2a is connected to the telephone set 4.

A hybrid circuit 6 separates the signals of the transmission system from the signals of the reception system. The hybrid circuit 6 sends a transmission signal from an adder 12 to the telephone line 2a through the NCU 2. The hybrid circuit 6 receives a signal from the partner through the NCU 2 and sends it to a modem 8 through a signal line 6a.

The modem 8 performs modulation and demodulation based on the ITU-T V. 8, V. 21, V. 27ter, V. 29, V. 17, and V. 34 recommendations. Each transmission mode of the modem 8 is designated by a signal line 20c. The modem 8 receives a signal output onto a signal line 20b and outputs modulated data onto a signal line 8a. The modem 8 receives a reception signal output onto a signal line 6a and outputs demodulated data onto a signal line 8b.

An ANSam signal sending circuit 10 outputs an ANSam signal. When a signal of level "1" is output onto a signal line 20d, the ANSam signal sending circuit 10 outputs an ANSam signal onto a signal line 10a. When a signal of level "0" is output onto the signal line 20d, the ANSam signal sending circuit 10 outputs no signal onto the signal line 10a.

The adder 12 receives information from the signal line 8a and information from the signal line 10a and outputs the sum onto a signal line 12a. A reading circuit 14 reads the image of an original and outputs the read image data onto a signal line 14a. A recording circuit 16 sequentially records the information from a signal line 20e in units of lines.

A memory circuit 18 stores raw information of the read data or encoded information. The memory circuit 18 also stores reception information or decoded information.

A calling circuit 22 receives telephone number information output onto a signal line 20f and outputs a selection signal to a signal line 2b when a call command pulse appears on a signal line 20g.

A registration circuit 24 registers the presence/absence of the V. 8 and V. 34 communication functions in correspondence with the destination parties. The registration circuit 24 registers, through a signal line 24a, the presence/absence of the V. 8 and V. 34 communication functions of the partners in correspondence with one-touch dialing and abbreviated dialing. In the first embodiment of the present invention, the partner has the V. 8 and V. 34 communication functions. When an ANSam signal is transmitted within a predetermined period of time (e.g., 3 sec) upon call connection, the registration circuit 24 registers the presence of the communication function.

An operation unit 26 has a one-touch dialing key, an abbreviated dialing key, a ten-key pad, the * and # keys, a setting key, a start key, a registration key for the circuit 24, and other function keys. Information of a depressed key is output onto a signal line 26a.

In the facsimile apparatus having the communication function of the ITU-T V. 8, V. 34, and T. 30 (V. 21, V. 27ter, V. 29, and V. 17) recommendations and the function of registering the presence/absence of the V. 8 and V. 34 communication functions in correspondence with the respective destinations, the control circuit 20 preferentially controls to receive a CM or JM signal without receiving the ANSam signal when the partner receiver has the V. 34 communication function and the ANSam signal is transmitted within the predetermined period of time upon call connection.

Figure 2:
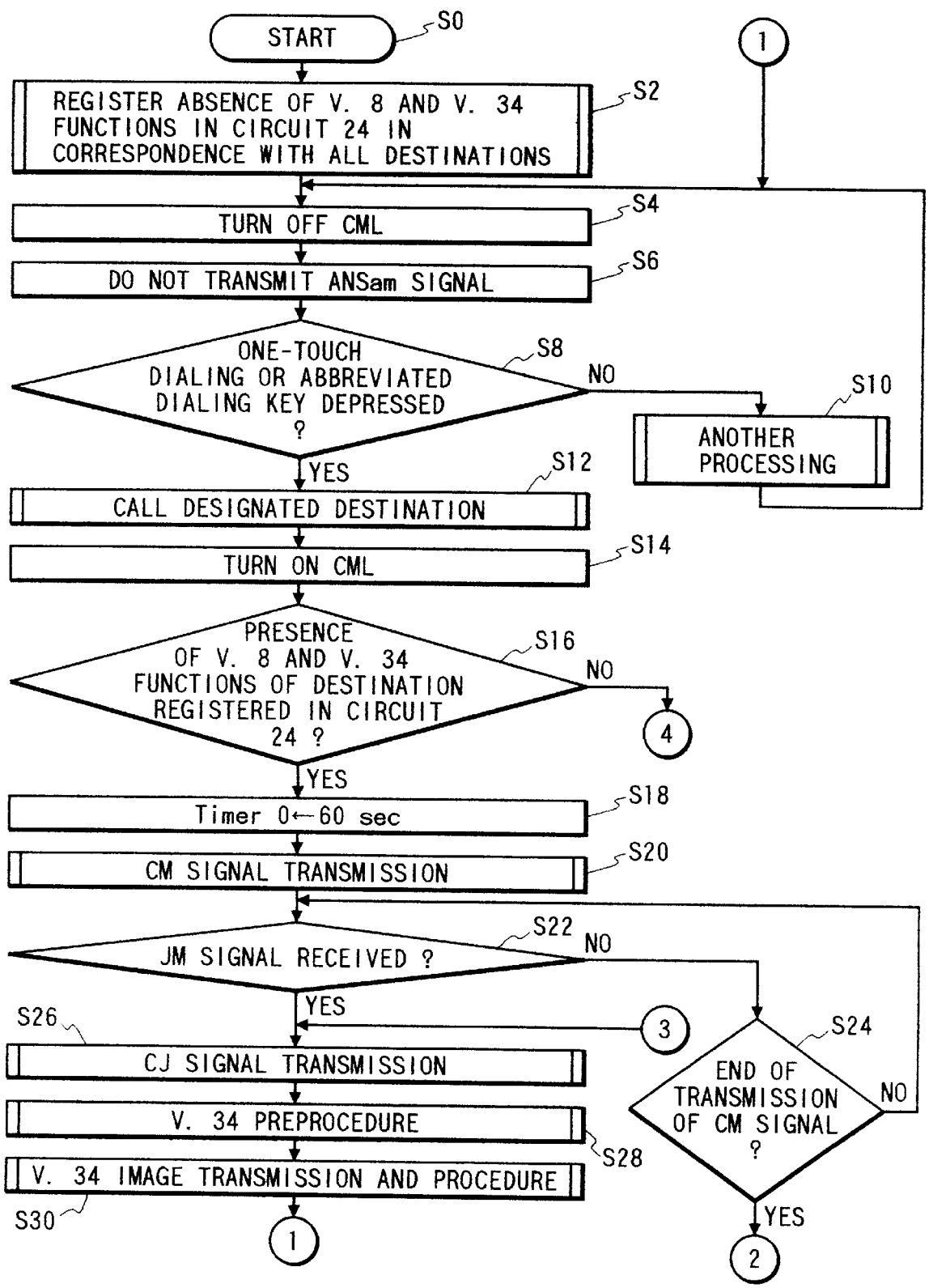
FIG. 2 is a flow chart showing the operation of the first embodiment of the present invention.
Figure 3:
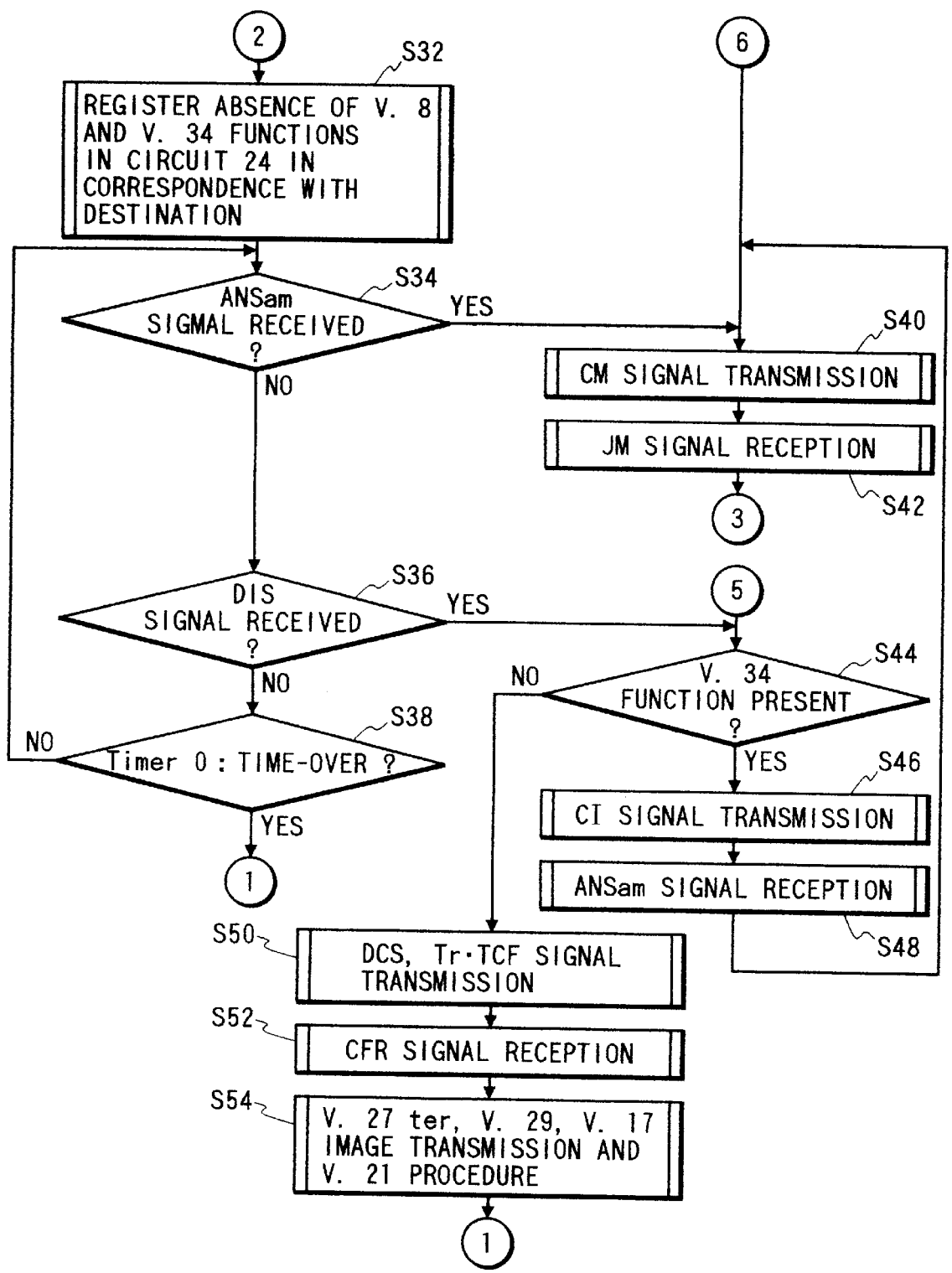
FIG. 3 is a flow chart showing the operation of the first embodiment of the present invention.
Figure 4:
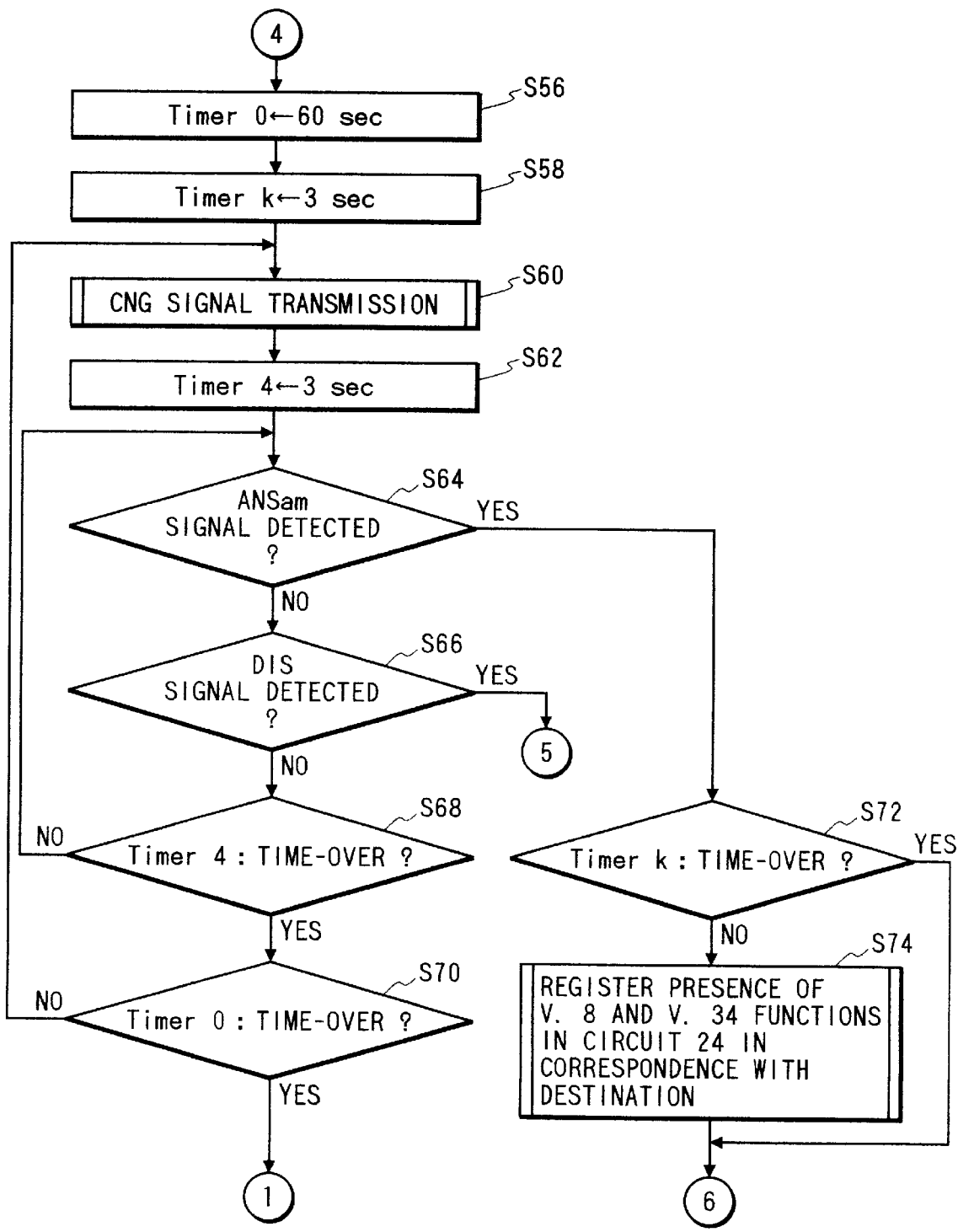
FIG. 4 is a flow chart showing the operation of the first embodiment of the present invention.

FIGS. 2 to 4 are flow charts showing the operation flow of the control circuit 20 in the first embodiment of the present invention.

Referring to FIG. 2, operation is started in step S0. In step S2, the registration circuit 24 registers the absence of the V. 8 and V. 34 functions for all the destination parties through the signal line 24a. In step S4, a signal of level "0" is output onto the signal line 20a to turn off the CML (Communication Line Relay). In step S6, a signal of level "0" is output onto the signal line 20d, and the ANSam signal is not transmitted.

In step S8, information on the signal line 24a is input to determine whether the one-touch dialing key or the abbreviated dialing key is depressed. If NO in step S8, the flow advances to step S10 to perform another processing.

If YES in step S8, the flow advances to step S12, and the originating circuit 22 is used to call the designated destination. In step S14, a signal of level "1" is output onto the signal line 20a to turn on the CML.

In step S16, the information on the signal line 24a is inputted and determines whether it is registered in the registration circuit 24 that the called designated destination has the V. 8 and V. 34 functions. If YES in step S16, the flow advances to step S18; otherwise, the flow advances to step S56.

In step S18, Timer0 is set with 60 sec. Step S20 represents transmission of the CM signal. It is determined in step S22 whether the JM signal is received. If YES in step S22, the flow advances to step S26; otherwise, the flow advances to step S24.

It is determined in step S24 whether transmission of the CM signal is complete. If NO in step S24, the flow advances to step S22; otherwise, the flow advances to step S32.

A CJ signal (signal representing the end of the CM signal) is transmitted in step S26, the V. 34 preprocedure is performed in step S28, and the image transmission and procedure are performed in the V. 34 mode in step S30. The flow then advances to step S4.

In step S32, the registration circuit 24 registers the absence of the V. 8 and V. 34 functions in correspondence with the called destination through the signal line 24a.

It is determined in steps S34, S36, and S38 whether the ANSam signal and a DIS signal (digital identification signal) are received before the time-over of Timer0. If the ANSam signal is received, the flow advances to step S40. If the DIS signal is received, the flow advances to step S44. When the time-over of Timer0 is detected, the flow advances to step S4.

The CM signal is transmitted in step S40, the JM signal is received in step S42, and the flow advances to step S26.

It is determined in step S44 on the basis of the FIF of the DIS signal whether the partner machine has the V. 34 communication function. If NO in step S44, the flow advances to step S50.

The CI signal is transmitted in step S46, the ANSam signal is received in step S48, and the flow then advances to step S40.

A DCS (digital command signal) signal, a Tr (training) signal, and a TCF (training check) signal are transmitted in step S50, and a CFR (reception preparation confirmation) signal is received in step S52. In step S54, image transmission is performed in the V. 27ter, V. 29, V. 17 modes, and the V. 21 procedure is performed. The flow then advances to step S4.

In step S56, Timer0 is set with 60 sec. In step S58, Timerk is set with 3 sec. It is determined using this timer whether the ANSam signal is transmitted within 3 sec upon call connection.

A CNG (call tone: 1,100 Hz) signal is transmitted in step S60, and Timer4 is set with 3 sec in step S62.

It is determined in steps S64, S66, and S68 whether the ANSam or DIS signal is detected before the time-over of Timer4. If the ANSam signal is detected, the flow advances to step S72. If the DIS signal is detected, the flow advances to step S44. When the time-over of Timer4 is detected, the flow advances to step S70.

It is determined in step S70 whether the time-over of Timer0 is detected. If NO in step S70, the flow advances to step S60; otherwise, the flow advances to step S4.

It is determined in step S72 whether the time-over of Timerk is detected. If YES in step S72, the flow advances to step S40; otherwise, the flow advances to step S74.

In step S74, the registration circuit 24 registers the presence of the V. 8 and V. 34 functions in correspondence with the called destination. The flow then advances to step S40.

The second embodiment of the present invention will be described below.

In a facsimile apparatus having the communication functions of the ITU-T V. 8, V. 34, V. 21, V. 27ter, V. 29, and V. 17 recommendations and the function of registering the presence/absence of the V. 8 and V. 34 communication functions in correspondence with the respective destinations, a control circuit 20 of the second embodiment transmits a CM signal and receives a JM signal upon detection of the 2,100-Hz component of an ANSam signal when the partner receiver has the V. 34 communication function.

Figure 5:
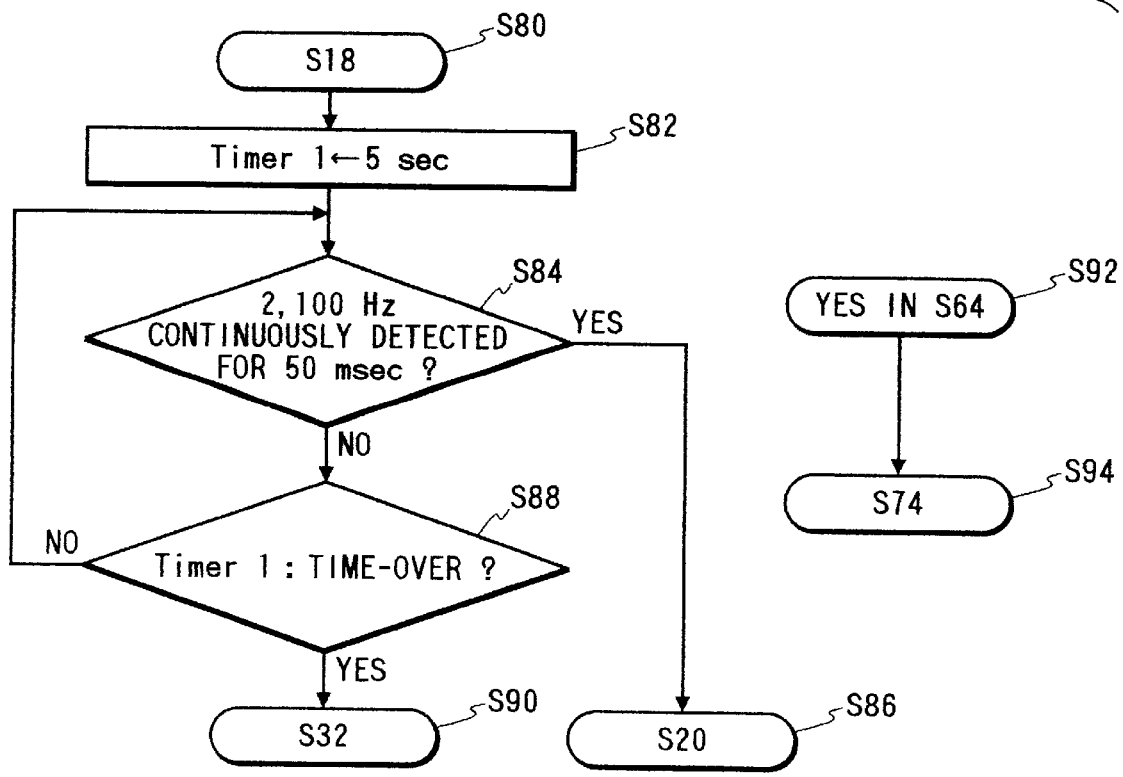
FIG. 5 is a flow chart showing the operation of the second embodiment of the present invention.

FIG. 5 is a flow chart showing part different from the first embodiment in the control of the control circuit 20 of the second embodiment.

Referring to FIG. 5, step S80 corresponds to step S18. In step S82, Timer1 is set with 5 sec.

It is determined in step S84 whether the 2,100-Hz frequency is continuously detected for 50 msec. If YES in step S84, the flow advances to step S86 (S20); otherwise, the flow advances to step S88.

It is determined in step S88 whether the time-over of Timer1 is detected. If NO in step S88, the flow advances to step S84; otherwise, the flow advances to step S90 (S32).

Step S92 represents YES in step S64. The flow advances to S74 from step S94. That is, the process in step S72 is omitted.

The third embodiment of the present invention will be described below.

In a facsimile apparatus having the communication functions of the ITU-T V. 8, V. 34, V. 21, V. 27ter, V. 29, and V. 17 recommendations and the function of registering the presence/absence of the V. 8 and V. 34 communication functions in correspondence with the respective destinations, a control circuit 20 of the third embodiment detects an ANSam signal for a predetermined period of time when the partner receiver has the V. 34 communication function. If the ANSam signal is detected, the control circuit 20 transmits a CM signal and receives a JM signal. However, if no ANSam signal is detected, the control circuit may shift the control to the reception of the V. 21 signal.

Figure 6:
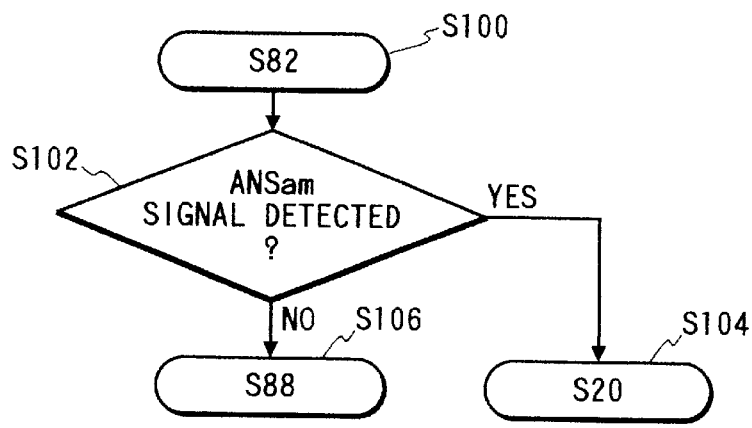
FIG. 6 is a flow chart showing the operation of the third embodiment of the present invention.

FIG. 6 is a flow chart showing part different from the first embodiment in the control of the control circuit 20 of the third embodiment.

Referring to FIG. 6, step S100 corresponds to step S82. It is determined in step S102 whether the ANSam signal is detected. If YES in step S102, the flow advances to step S104 (S20); otherwise, the flow advances to step S106 (S88).

Each embodiment described above has exemplified facsimile communications complying with the ITU-T V. 8 and V. 34 recommendations. The present invention is also applicable to a facsimile apparatus based on a communication protocol having the same function as the above recommendations.

Each embodiment described above has exemplified a facsimile apparatus of a stand-alone facsimile apparatus. The present invention is not limited to this. The present invention is applicable to facsimile communication control in an overall data processing system having, e.g., a copying function, an electronic file function, and a combination of a data processing function and a communication function, as a matter of course.

The present invention is not limited to the particular embodiments described above, and various changes and modifications may be made within the spirit and scope of the invention.

What is claimed is:

1. A communication apparatus with a communication function that complies with ITU-T V. 8 and V. 34 recommendations, comprising:

determination means for determining whether a partner has V. 8 and V. 34 communication functions; and transmission means for omitting only determination of reception of an ANSam signal of a V. 8 modes and transmitting a CM signal of the V. 8 mode upon call connection with the partner when said determination means determines that the partner has the V. 8 and the V. 34 communication functions.

2. An apparatus according to claim 1, wherein said transmission means omits detailed determination processing of reception of the ANSam signal.

3. An apparatus according to claim 2, wherein said transmission means determines reception of the ANSam signal upon detection of a 2,100-Hz signal component, and shifts control to transmission of the CM signal.

4. An apparatus according to claim 1, further comprising registration means for registering information representing whether each of a plurality of partners has the V. 8 and the V. 34 communication functions, wherein said determination means determines whether the partner has the V. 8 and the V. 34 communication functions based on the information registered in said registration means.

5. A communication apparatus with a communication function that complies with ITU-T V. 8 and V. 34 recommendations, comprising:

determination means for determining whether a partner has a V. 34 communication function; and processing means for omitting communication of a signal of a V. 8 mode upon call connection with the partner when said determination means determines that the partner has the V. 34 communication function.

6. A communication method in a communication apparatus capable of performing communications that comply with ITU-T V. 8 and V. 34 recommendations, comprising:

a determination step of determining whether a partner has V. 8 and V. 34 communication functions; and a transmission step of omitting only determination of reception of an ANSam signal of a V. 8 mode, and transmitting a CM signal of the V. 8 mode upon call connection with the partner when it is determined in said determination step that the partner has the V. 8 and the V. 34 communication functions.

7. A method according to claim 6, wherein said transmission step comprises omitting detailed determination processing of reception of the ANSam signal.

8. A method according to claim 7, wherein said transmission step comprises determining reception of the ANSam signal upon detection of a 2,100-Hz signal component, and shifting control to transmission of the CM signal.

9. A method according to claim 6, further comprising a registration step of registering information representing whether each of a plurality of partners has the V. 8 and the V. 34 communication functions, wherein said determination step determines whether the partner has the V. 8 and the V. 34 communication functions based on the information registered in said registration step.

10. A communication method in a communication apparatus capable of performing a communication function that complies with ITU-T V. 8 and V. 34 recommendations, comprising:

a determination step of determining whether a partner has a V. 34 communication function; and a processing step of omitting communication of a signal of a V. 8 mode upon call connection with the partner when said determination step determines that the partner has the V. 34 communication function.

* * * * *

UNITED STATES PATENT AND TRADEMARK OFFICE
CERTIFICATE OF CORRECTION

PATENT NO. : 6,075,620

DATED : June 13, 2000

INVENTOR(S) : TAKEHIRO YOSHIDA ET AL.

It is certified that error appears in the above-identified patent and that said Letters Patent is hereby corrected as shown below:

COLUMN 5

Line 52, "modes" should read --mode,--.

Signed and Sealed this

Twenty-second Day of May, 2001

Attest:

NICHOLAS P. GODICI

*Attesting Officer*  Acting Director of the United States Patent and Trademark Office